Figure 1:
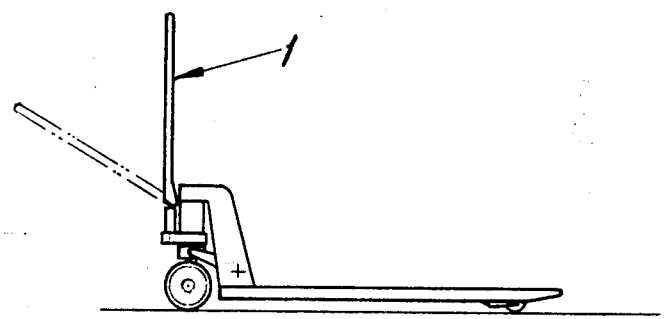

United States Patent [19]

Bryntse et al.

[11] 3,940,338
[45] Feb. 24, 1976

[54] LIFTING VEHICLE HAVING A CONTROL MEMBER ADJUSTABLE INTO THREE DIFFERENT POSITIONS

[75] Inventors: Anders Ivar Bryntse, Mjölby; Karl-Erik Berkestad, Linkoping, both of Sweden

[73] Assignee: Ab Bygg- Och Transportekonomi (BT), Mjolby, Sweden

[22] Filed: Mar. 27, 1975

[21] Appl. No.: 562,899

Related U.S. Application Data

[63] Continuation-in-part of Ser. No. 400,629, Sept. 25, 1973, abandoned.

[30] Foreign Application Priority Data
Oct. 3, 1972   Sweden............................ 12733/72

[52] U.S. Cl................................ 254/2 R; 280/43.12
[51] Int. Cl.²......................................... B62D 21/14
[58] Field of Search.......... 254/2 R, 2 B, 2 C, 93 R, 254/93 L; 280/43.12

[56] References Cited
UNITED STATES PATENTS

| | | | |
|---|---|---|---|
| 1,458,534 | 6/1923 | Lovejoy | 254/2 C |
| 2,789,648 | 4/1957 | Huffman | 280/43.12 |
| 3,098,587 | 7/1963 | Hopfeld | 254/2 R |
| 3,188,107 | 6/1965 | Quayle | 280/43.12 |
| 3,286,985 | 11/1966 | Edera | 254/93 R |

FOREIGN PATENTS OR APPLICATIONS

| | | | |
|---|---|---|---|
| 116,353 | 6/1969 | Norway | 280/43.12 |

*Primary Examiner*—Al Lawrence Smith
*Assistant Examiner*—Robert C. Watson
*Attorney, Agent, or Firm*—Young & Thompson

[57] ABSTRACT

A pallet truck is provided with a tiller and a lift device including a lift jack. This is pumped by means of the tiller. In the upper part of this tiller is pivotally mounted a control lever for controlling the lift device for its functioning in different ways. For this purpose the lever is adjustable into three different positions, two outer ones and a middle one, and is by means of a link rod connected to the lift device. The link rod is spring loaded in such a way that it tends to move the lever from one outer position to the other outer position. One outer position is a pumping position for raising the jack. The other outer position is a release position for lowering the jack; while the middle position is a neutral position.

3 Claims, 8 Drawing Figures

LIFTING VEHICLE HAVING A CONTROL MEMBER ADJUSTABLE INTO THREE DIFFERENT POSITIONS

This application is a continuation-in-part of my co-pending application Ser. No. 400,629, filed Sept. 25, 1973, now abandoned.

The present invention relates to vehicles provided with a lift device and a tiller, said tiller also being used as a pump rod for a lift jack included in the lift device, said vehicle further being provided with a control member adjustable into three different positions, namely, first and second outer positions and a middle position, in order to control the lift device for its function in different ways.

For instance, certain hydraulically operated elevating pallet trucks use such a combined tiller, steering rod and pump rod. For the sake of simplicity this rod in the following will be called only a tiller. Such trucks are generally so arranged that the load is lifted by pressing the tiller forwardly and downwardly, the pump piston of a hydraulic lift jack thereby being pressed down causing oil to be forced into a lift cylinder, the piston of which through different mechanisms lifts the load.

Pallet trucks of this type are shown for example in U.S. Pat. Nos. 3,188,107 and 3,286,985, so that it is not necessary to describe in greater detail the structure common to those patents and this invention.

In FIG. 1 is shown such a pallet truck having a tiller designated 1. If the truck is to be moved backward the tiller is brought into its vertical, full line position according to FIG. 1 and the operator pushes the truck before him by pressing on the handle bar of the tiller. If thereafter the truck is to be moved forward the operator again has to turn the tiller forwardly and downwardly into the dash-dot line position according to FIG. 1. If the truck is heavily loaded, great power must be applied when making this swinging movement of the tiller as this movement also means that the lift jack produces a pump stroke lifting the load further.

The object of the present invention is to solve this problem.

According to the invention the control member consists of a lever pivotally mounted in the upper part of the tiller, which lever through a link rod, extending lengthwise of the tiller, is connected to the lift device, the link rod being spring loaded in such a way, that the lift device and thus the lever tends to move into the second one of said outer positions.

Figure 2:
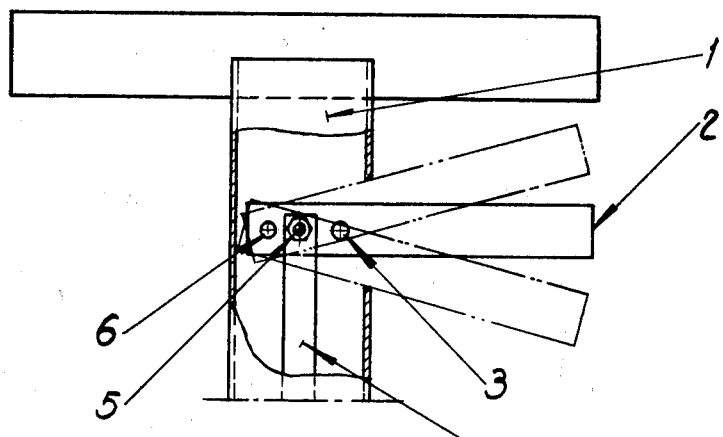
Figure 3:
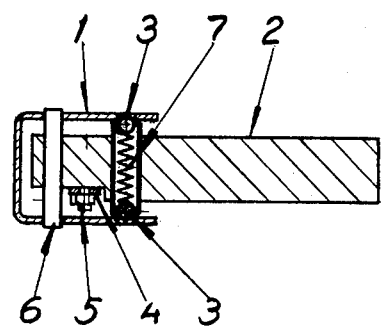
Figure 4:
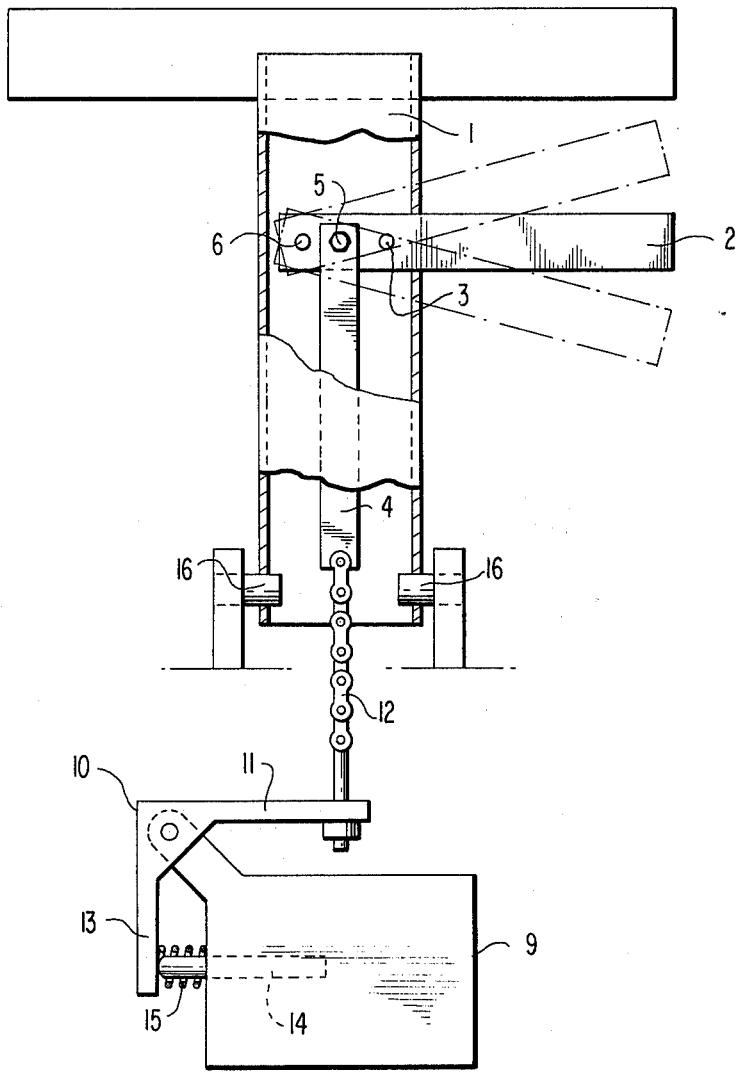
Figure 6:
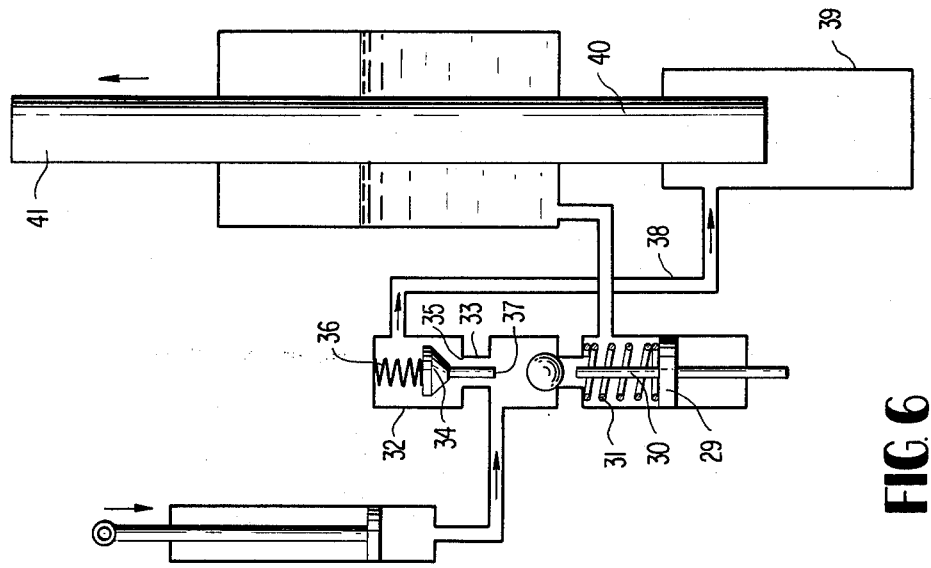
Figure 5:
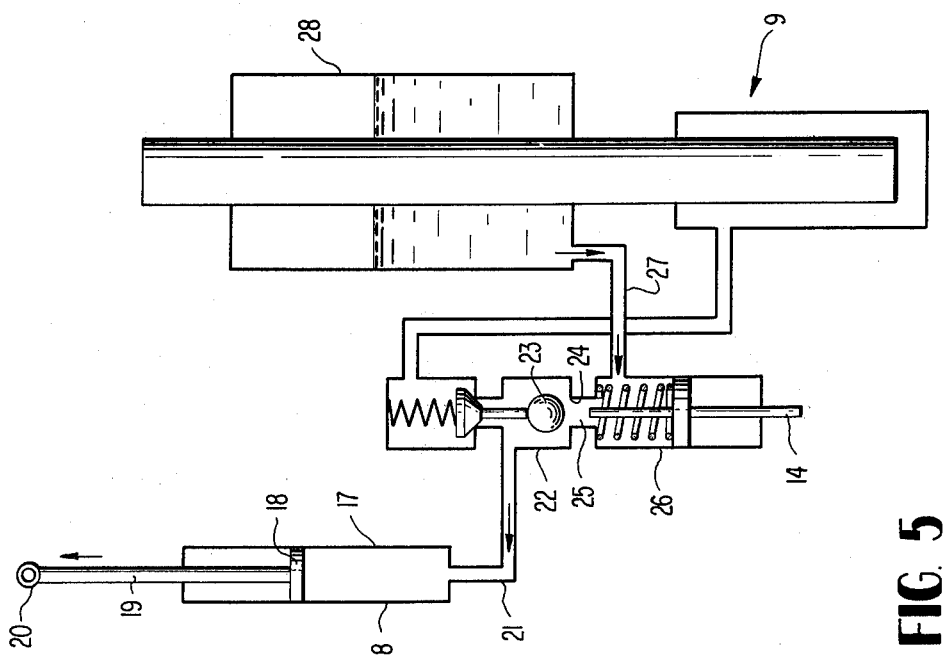
Figure 8:
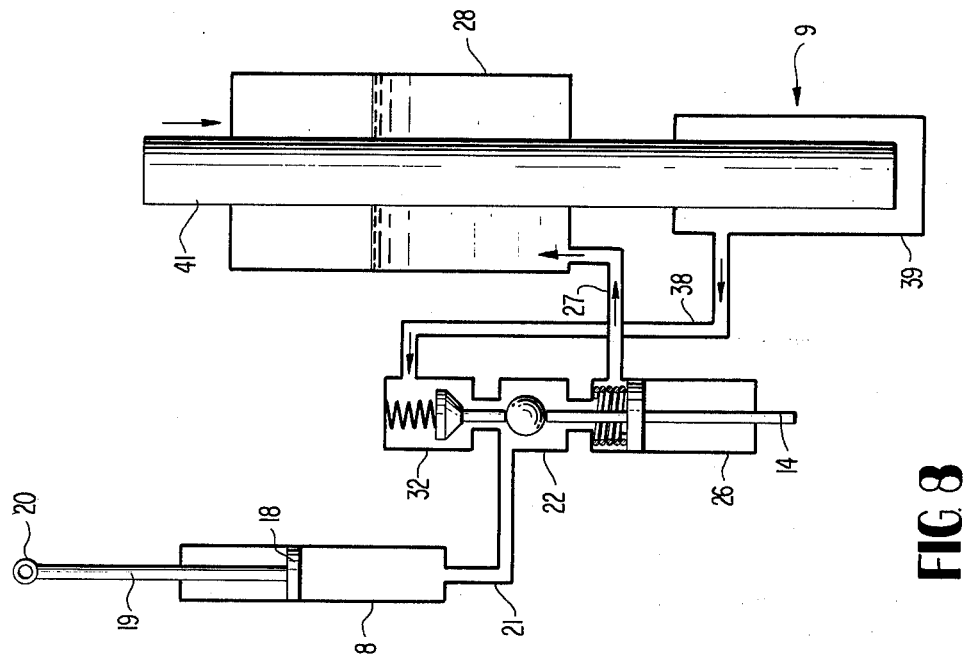
Figure 7:
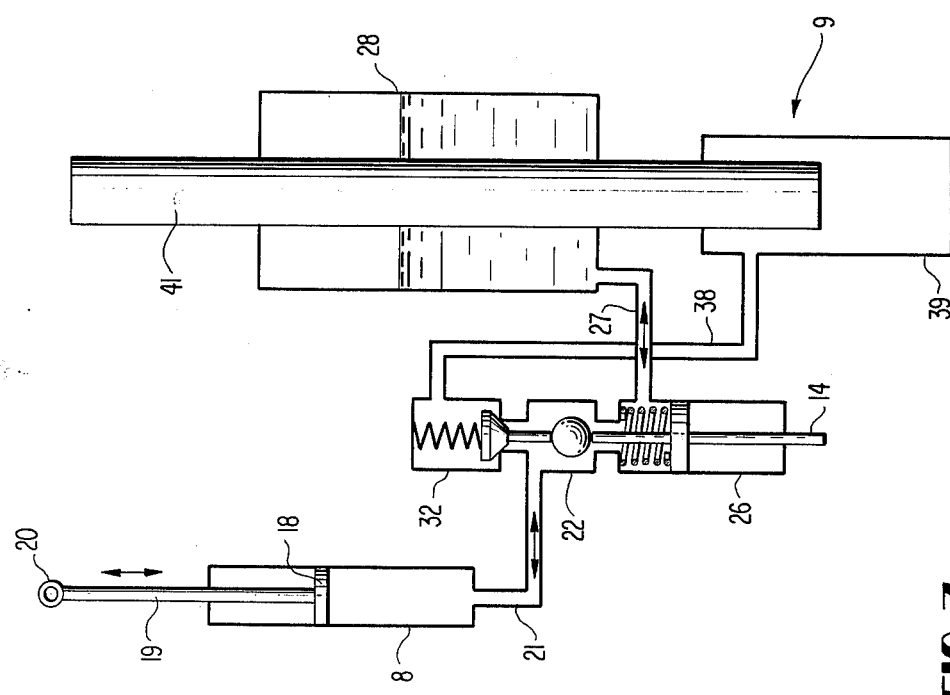

To exemplify the invention an embodiment of it will now be described with reference to the accompanying drawings, wherein:

FIG. 1 as mentioned above discloses an elevating pallet truck which is shown in a side view, FIG. 2 shows a front view, partly in section, of the upper part of a tiller included in said truck, FIG. 3 shows a sectional view of the same tiller, FIG. 4 shows a schematic view of what the tiller controls, FIGS. 5 and 6 are hydraulic circuit diagrams of the lift control in the pumping position, and FIGS. 7 and 8 are similar to FIGS. 5 and 6 but showing the parts in the neutral and release positions, respectively.

FIG. 2 discloses how a control lever 2 is pivotally mounted about a shaft 6 transversely passing through the upper part of the tiller 1. The lever 2 is adjustable into three different positions, of which in FIG. 2 the upper and lower ones are shown in dash-dot lines and the middle one is shown in full lines. The lever is provided with a pin 5 about which is pivoted a downwardly spring-loaded rod 4 controlling the lift device in dependence on the position of the lever 2.

In the upper position of the lever 2 the lift device of the truck is so adjusted that the load is lowered. In the lower position, the pump position, the tiller 1 operates a pump 8 to raise a lift jack included in the lift device 9; and in the middle or neutral position the tiller will be disconnected from the lift jack.

In the middle position the lever 2 is locked with a relatively small force to the tiller 1. This locking device is shown in FIG. 3 which is a sectional view through the tiller 1 and through the lever 2 (middle position) at the level of the shaft 6. Inserted in the lever 2 is a transverse spring 7. Each end of spring 7 engages a ball 3 and forces it into engagement with recesses in the tiller 1. Thus this locking takes place when the lever is in its middle position. Through adjusting the force of the spring 7 to a suitable value, it can be achieved that the lever, when in its upper position, can be released from that upper position and then automatically is pulled down into its lower position without stopping in its middle position. This function simplifies the operation of the truck further. In order to bring the lever to stop in its middle position the operator must keep hold of the lever, while it is moved by the spring to this position.

Referring now to FIG. 4, it will be seen that the lift device 9 is provided with an angular lever arm 10 having one leg 11 which, via a chain 12, is connected to the lower end of the rod 4. The other leg 13 of arm 10 reciprocates a pin 14, which is urged outwardly by a spring 15. Pin 14 is a valve actuator whose function can be seen in FIGS. 5–8.

Consider next FIGS. 5 and 6, in which the parts are in the pumping position. The pump 8 is seen to the left of the figures; and it will be understood that FIG. 5 shows the upstroke of the pump, while FIG. 6 shows the downstroke of the pump.

The pump 8 includes cylinder 17 in which a piston 18 is reciprocable under the influence of a piston rod 19 which at its upper end has a connection 20 for pivotal connection to tiller 1 at a point spaced from the horizontal axis of vertical swinging movement of tiller 1. Thus, vertical swinging movement of tiller 1 reciprocates piston 18 to operate pump 8.

Pump 8 communicates through conduit 21 with a valve chamber 22 containing a ball 23 that moves vertically into and out of contact with its annular seat 24 to open and close a passageway 25 to a cylinder 26 which communicates through conduit 27 with an oil reservoir 28. Cylinder 26 receives an end of pin 14 that is secured to a piston 29 that slides sealingly in cylinder 26 and that carries a further pin 30 that in turn is surrounded by a coil compression spring 31 that acts in the same direction as spring 15. In fact, either one of springs 15 or 31 can be eliminated, but not both.

Above chamber 22 in FIGS. 5 and 6 is a chamber 32 that communicates with chamber 22 through a passageway 33. A valve cone 34 is urged against its seat 35 by spring 36 to close passageway 33. A pin 37 depends from cone 34 and extends through passageway 33. Cone 34 thus establishes or interrupts communication between chambers 22 and 32.

Chamber 32 communicates through conduit 38 with a cylinder 39 in which sealingly slides the lift piston 40 that also passes sealingly through oil reservoir 28. The upper end 41 of piston 40 emerges from lift device 9 and bears against the underside of the forward ends of the forks of the truck in the manner disclosed in the above-identified patents, thereby to constitute a lift jack.

It will be understood that cylinder 17 below piston 18, and conduit 21, cylinder 26 above piston 29, chambers 22 and 32, conduits 27 and 38, cylinder 39, and at least the lower part of oil reservoir 28, are always completely full of a hydraulic fluid such as oil. Therefore, in the upstroke position of FIG. 5, when the tiller 1 is swung upwardly drawing piston 18 up as seen in FIG. 5, oil flows from reservoir 28 through conduit 27, cylinder 26, passageway 25, chamber 22, conduit 21 and into the lower end of cylinder 17. Ball 23 is raised against pin 37. Cone 34 is firmly held against its seat 35 not only by the spring 36 but also by the suction created by the rising piston 18, so that conduit 38 is closed and oil neither enters nor leaves cylinder 39. Lever 2 is in its lower position of FIGS. 2 and 4, and so spring 15 and/or spring 31 maintain pin 14 in its outer postion in FIG. 4, which is its lower position in FIGS. 5 and 6, so that pin 30 is spaced below any position that can be reached by ball 23 both in the FIG. 5 and in the FIG. 6 positions of ball 23.

FIG. 6 shows the pumping position, when tiller 1 is swung downwardly, which is counterclockwise in FIG. 1, thereby to move piston 18 downwardly in cylinder 17. Oil then flows out of cylinder 17 through conduit 21 and into chamber 22, where it depresses ball 23 against seat 24 thereby sealing conduit 27 so that oil cannot return to reservoir 28. Instead, the oil passes from chamber 22 through passageway 33 and raises cone 34 against the action of spring 36 and flows through conduit 38 into cylinder 39, raising piston 40. This elevates the forward ends of the forks of the truck; and this operation can be repeated unitl the desired elevation is reached.

To reach a neutral position in which the jack will be neither raised nor lowered but in which the tiller 1 can be swung at will for transporting the load, the lever 2 is raised to its full line position or middle position shown in FIGS. 2 and 4, against the action of springs 15 and/or 31, whereupon the parts assume their FiG. 7 or neutral position. The raising of lever 2 has swung lever arm 10 counterclockwise to move pin 14 farther into cylinder 26, thereby moving pin 30 up into passageway 25 to the point that the upper end of pin 30 engages ball 23 and lifts ball 23 off its seat 24 and holds passageway 25 open. Cone 34 is held by spring 36 against its seat 35; and also the weight of the forks acting through piston 40 on the oil in cylinder 39 holds cone 34 against its seat 35. Vertical swinging movement of tiller 1 in this position of the parts, that is to say, vertical reciprocatory movement of piston 18 in cylinder 17, thus merely moves oil back and forth between cylinder 17 and reservoir 28 against only the resistance of the oil flowing through the circuit that includes conduits 21 and 27.

Moving lever 2 to the upper position, that is, urging pin 14 to its innermost position, which is the uppermost position of pin 14 shown in FIG. 8, raises ball 23 farther, to the extent that ball 23 contacts the lower end of pin 37 and thus lifts cone 34 off its seat 35. Ball 23 holds cone 34 elevated, so that oil is now free to flow from cylinder 39 through conduit 38, through chamber 32 past cone 34, through chamber 22 and into cylinder 26 and through conduit 27 into reservoir 28. The weight of the forks and piston 40 thus causes them to sink and to perform the work necessary to move the oil by this path from cylinder 39 to reservoir 28, thereby lowering the forward ends of the forks.

It will be appreciated from the above that the positioning of lever 2 adjacent the handle of tiller 1 makes it quite convenient to operate the device. When lever 2 is in its lowermost or pumping position, it need not be touched because it is spring urged to that position and the tiller handle can be grasped with both hands to oscillate it to effect the pumping.

After the load has arrived at the intended level, with the handle bar still in the operator's grip, lever 2 can be moved by the fingers upward to the middle position and released there because it will be weakly locked in that position by the engagement of the balls 3 in the associated recesses under the urging of the spring 7. It is thereafter not necessary to touch the lever 2 to maintain it in a neutral position, and the tiller can thus be swung vertically as desired to move the load in any direction and to push or pull the truck, with no pumping effect and with the jack maintaining its predetermined elevation.

To lower the load, the lever 2 is pulled upward to its upper position and manually held there until the truck descends to the degree desired. The lever can then be slowly released, whereupon it will be returned to its neutral position by the spring action described above; or it can be quickly released whereupon the springs 15 and/or 31 will pull it through the neutral position to the lowermost position for further pumping.

The lever can thus be easily controlled by the fingers of one hand without releasing the two-hand hold of the handle bar of the tiller, which results in a saving of time and trouble as compared to the operation of known devices.

The pumping and release and neutral positions of the device can of course be rearranged with respect to the three positions of the lever, without departing from the invention. Thus, for example, the pumping position could be uppermost and the release lowermost and the neutral intermediate, or there could be some other arrangement of these positions.

From a consideration of the foregoing disclosure, therefore, it will be evident that the initially recited object of the present invention has been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A vehicle having a lift-jack-operated lift device and a tiller, said tiller also comprising a pump rod for said lift jack, a control lever pivotally mounted in the upper part of said tiller and extending transversely therefrom and connected to one end of a link rod displaceably mounted lengthwise of said tiller, said link rod at its other end being connected to and controlling said lift device, said control lever taking three different positions, a first and a second outer position and a middle position, corresponding to three different displacement positions of the link rod, said link rod in these different positions setting the lift device for three different functions, said link rod further being spring loaded for moving said control lever into its second outer position, a locking device for said control lever for locking said lever only in its middle position and having such a weak force in relation to said spring, that when the control lever is manually kept in its first outer position against said spring and is released therefrom said lever will be automatically moved by said spring into said second outer position thereby passing the middle position without being locked there.

2. A vehicle as claimed in claim 1, said locking device comprising a pair of balls carried by said control lever, and spring means urging said balls oppositely outwardly into recesses in said tiller in said middle position of said lever.

3. A vehicle as claimed in claim 1, said control lever in one of said outer positions controlling said lift device so that vertical swinging movement of said tiller pumps said lift jack to raise said lift jack, said control lever in the other of said outer position releasing said lift jack to lower the same, and said lever in said middle position disconnecting said jack from said tiller so that said tiller can be swung vertically without operating said jack.

* * * * *